United States Patent [19]
Lyon

[11] Patent Number: 4,849,192
[45] Date of Patent: * Jul. 18, 1989

[54] METHODS FOR PREVENTING FORMATION OF SULFURIC ACID AND RELATED PRODUCTS IN COMBUSTION EFFLUENTS

[75] Inventor: Richard K. Lyon, Pittstown, N.J.

[73] Assignee: Energy and Environmental Research Corp., Irvine, Calif.

[*] Notice: The portion of the term of this patent subsequent to May 10, 2005 has been disclaimed.

[21] Appl. No.: 169,211

[22] Filed: Mar. 16, 1988

Related U.S. Application Data

[63] Continuation-in-part of Ser. No. 35,753, Apr. 8, 1987, Pat. No. 4,743,436.

[51] Int. Cl.$^4$ .................... C01B 21/00; C01B 17/00; B01J 8/00
[52] U.S. Cl. .................................. 423/235; 423/234; 423/242
[58] Field of Search .................... 423/235, 235 D, 239, 423/242 R, 242 A

[56] References Cited

U.S. PATENT DOCUMENTS

| | | | |
|---|---|---|---|
| 3,382,822 | 5/1968 | Bienstock | 110/28 |
| 3,900,554 | 8/1975 | Lyon | 423/235 |
| 4,041,699 | 8/1977 | Schelp | 60/39.55 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,350,669 | 9/1982 | Izumi et al. | 423/235 |
| 4,368,057 | 1/1983 | Matthews | 48/197 |
| 4,395,223 | 7/1983 | Okigami et al. | 431/10 |
| 4,585,632 | 4/1986 | Schneider et al. | 423/239 |
| 4,743,436 | 5/1988 | Lyon | 423/235 |

FOREIGN PATENT DOCUMENTS

| | | |
|---|---|---|
| 2719417 | 2/1978 | Fed. Rep. of Germany . |
| 52-014619 | 2/1977 | Japan . |
| 52-042461 | 4/1977 | Japan . |
| 53-070968 | 7/1978 | Japan . |
| 54-038268 | 3/1979 | Japan . |
| 1572118 | 7/1980 | United Kingdom . |

OTHER PUBLICATIONS

Miller, J. A. et al., "Combustion Energy," Special Report from Chemical and Engineering News, pp. 22–46 (Aug. 31, 1987).

Perry, R. A. et al., "Rapid Reduction of Nitrogen Oxides in Exhaust Gas Streams", Nature, vol. 324, 18/25, pp. 657–658 (Dec. 1986).

Yano, T. et al., "Behavior of Methanol and Formaldehyde in Burned Gas from Methanol Combustion, Effects of Nitric Oxide on Oxidation Reaction," Bulletin of the SME, vol. 26, No. 213, pp. 406–413 (Mar. 1983).

Primary Examiner—Gregory A. Heller
Attorney, Agent, or Firm—Workman, Hydegger & Jensen

[57] ABSTRACT

The present invention is related to a method for preventing the formation of $NH_4HSO_4$ during the noncatalytic reduction of nitric oxide by ammonia or ammonia precursors in combustion effluents. The present invention is also related to a method for preventing the formation of $H_2SO_4$ in the absence of ammonia or its precursors. The formation of these corrosive substances is extremely detrimental. $NH_4HSO_4$ formation is a limitation upon the usefulness of nitric oxide reduction processes, particularly in boilers, furnaces, and other combustion devices. The formation of $H_2SO_4$ limits effective heat recovery in combustion equipment.

The present invention specifically teaches the use of methanol to reduce $SO_3$ in the effluent stream to $SO_2$. The noncatalytic reduction of $SO_3$ by methanol is selective in that a large fraction of the $SO_3$ is converted to $SO_2$, while on a percentage basis very little oxygen is consumed. In addition, the process of the present invention allows the amount of methanol to be limited such that significant amounts of carbon monoxide are not produced and emitted with the effluent stream. By eliminating $SO_3$, the formation of $NH_4HSO_4$ and $H_2SO_4$ can be blocked.

The present invention teaches contacting the methanol with the combustion effluent at a temperature ranging from approximately 500° C. to about 950° C. in order to assure proper operation of the process. It is also important to limit the reaction time used so that the carbon monoxide produced by the methanol oxidation is not itself oxidized to carbon dioxide.

24 Claims, No Drawings

METHODS FOR PREVENTING FORMATION OF SULFURIC ACID AND RELATED PRODUCTS IN COMBUSTION EFFLUENTS

RELATED APPLICATIONS

This application is a continuation-in-part application of copending application Ser. No. 07/035,753 filed Apr. 8, 1987, now U.S. Pat. No. 4,743,436 and entitled "METHODS FOR PREVENTING AMMONIUM BISULFATE FORMATION DURING THE NONCATALYTIC REDUCTION OF NITRIC OXIDE," which application is incorporated herein by this reference.

BACKGROUND

The Field of the Invention

The present invention is related to methods for preventing corrosion and fouling of boilers, furnaces, and other burner equipment through preventing the formation of ammonium bisulfate ($NH_4HSO_4$) and sulfuric acid ($H_2SO_4$) in the effluent stream from said boilers, furnaces and other burner equipment. More particularly, the present invention relates to preventing the formation of ammonium bisulfate and sulfuric acid by the selective, noncatalytic reduction of sulfur trioxide ($SO_3$) to sulfur dioxide ($SO_2$), thereby making the $SO_3$ unavailable to react with water vapor or water vapor and ammonia to form those undesirable products.

THE BACKGROUND OF THE INVENTION

A. General Background

One of the major problems in modern industrialized society is the production of air pollution from numerous sources. Air pollution can take various forms. Some of the different types of air pollutants include particulate emissions such as dust, coal particles and the like, sulfur compounds such as $SO_2$ and $SO_3$, ozone, carbon monoxide emissions, volatile hydrocarbon emissions, and the emission of nitrogen compounds commonly referred to collectively as "$NO_x$." Pollution sources include automobiles, industrial plants, small commercial establishments (such as dry cleaners and service stations), and even nature itself.

Combustion effluents and waste products from particular types of sources have proven to be major contributors to damaging air pollution when the effluents are discharged into the atmosphere. Unless these waste products are treated before their release into the atmosphere, serious smog and other air pollution problems are encountered. It will be readily appreciated that high concentrations of air pollutants can have serious deleterious impacts on the health and the general welfare of society. Air pollution is known to aggravate certain medical conditions (such as heart and lung problems) and is known to cause problems in the environment ranging from corrosion to acid rain.

One of the most common components found in polluted air is nitrogen dioxide ("$NO_2$"), which is known to be an extremely poisonous material. Nitrogen dioxide, which is brown in color, undergoes a series of reactions known generally as "photochemical smog formation" in the presence of sunlight and airborne hydrocarbons. These reactions result in a marked decline in overall air quality. While $NO_2$ is produced from a wide variety of pollution sources, its primary source is from NO released into the air. NO is commonly formed during combustion processes, including internal combustion engines in automobiles, hydrocarbon fueled power plants, process furnaces, incinerators, coal fired utility boilers, glass furnaces, cement kilns, oil field steam generators, gas turbines, and other similar installations.

In these combustion processes, part of the ambient oxygen combines with atmospheric nitrogen (rather than with the fuel) in the flame by a process generally known as "nitrogen fixation." Nitrogen fixation is primarily limited to processes where a flame is employed in the combustion process, as opposed to catalytic processes. However, if there are organic nitrogen compounds in the fuel, they may also form NO when the fuel is burned either by a flame or catalytically.

Since NO is the only oxide of nitrogen which is stable at the high temperatures encountered in these types of combustion processes, NO is the predominant product. At normal atmospheric temperatures, however, the equilibrium between NO and $NO_2$ favors $NO_2$. Hence, NO formed by combustion is generally discharged into the atmosphere as NO, and only subsequently is converted to $NO_2$. In order to control $NO_2$ emissions, therefore, it is necessary to deal to a large extent with NO before it enters the ambient air.

B. Nitrogen Removal Processes and Ammonium Bisulfate Formation

There have been considerable efforts in the art to find effective ways to remove oxides of nitrogen from waste gases so that these waste gases may be discharged to the atmosphere without harm to the environment. It has been found in the art that the removal of $NO_2$ is relatively easy since it reacts with water and air to form nitric acid. $NO_2$, therefore, is commonly removed by aqueous scrubbing.

If a base, such as ammonia, is added to the scrub water, the nitrogen scrubbing process is facilitated and ammonium nitrate is produced. If limited amounts of NO are present along with the $NO_2$, the NO may be co-scrubbed, thereby yielding ammonium nitrate.

These processes, however, are subject to the limitation that they are only effective for mixtures of nitrogen oxides which are predominantly $NO_2$, rather than predominantly NO. This is a problem because NO is the predominate species at the temperatures generally encountered in flue gases. As a result, various processes have been developed in the art for oxidizing NO to $NO_2$ so that the relative inexpensive and convenient scrubbing processes may take place. For example, methods have been developed for oxidizing and removing $NO_x$ exhausted from boilers, cinder furnaces, nitric acid factories, automobiles, and the like.

Several processes known in the prior art involve contacting the gaseous flow which includes NO, with various organic compounds (such as aldehydes, alcohols, ketones, organic acids, and the like) in the presence of oxygen. By such processes, the NO is oxidized to $NO_2$ which can then be removed by the scrubbing processes described above.

Similar processes have been developed whereby NO is oxidized to $NO_2$ by contacting the NO with other types of oxygen-containing hydrocarbons such as methanol and ethanol.

An alternative approach for removing NO from flue gases and other streams of pollutants is to reduce NO to nitrogen and water, which may then be discharged to the atmosphere. These processes generally teach the removal of $NO_x$ from flue gas by reduction of the NO by the addition of ammonia, or an ammonia precursor, alone or in combination with a second combustible material while the waste gas is at a relatively high temperature (generally from about 700° C. to about 1200° C.).

An example of such an NO reduction process is described in U.S. Pat. No. 3,900,554 to Lyon, issued Aug. 19, 1975 (hereinafter referred to as the "'554 patent"). The process disclosed in the '554 patent teaches the reduction of NO to $N_2$ by injecting ammonia into the combustion effluent stream at a temperature from about 870° C. to about 1100° C. If the $NH_3$ is injected along with a second reducing agent, such a hydrogen, NO will be reduced to $N_2$ at temperatures as low as 700° C.

The method described in the '554 patent for controlling the emission of NO to the atmosphere has a number of advantages. The NO in the emission stream is converted to molecular nitrogen and water. This conversion is accomplished without the use of any catalyst and hence without the substantial expense and difficulties inherent in catalytic processing of combustion effluents.

Moreover, according to the process of the '554 patent, the conversion of No to $N_2$ is selective and specific. Combustion effluents typically contain NO at concentrations of from about 100 to about 2,000 ppm, while oxygen concentrations are generally in the range from about 2% to about 10%. Thus, the concentration of oxygen is orders of magnitude greater than the concentration of NO.

If the reduction of NO were nonselective (i.e., if to reduce one percent of the NO, one had to reduce one percent of the oxygen), the amount of reducing agent required would be prohibitive. In the process described in the '554 patent, however, the reduction of NO is achieved with nearly equimolar quantities of $NH_3$. The reaction is highly selective; reducing a large fraction of the NO while leaving the oxygen largely untouched.

Notwithstanding the foregoing advantages, the process described in the '554 patent, and other processes which employ a nitrogen oxide reduction technique, encounter a severe disadvantage in most applications. Many of the sources of the coal and oil commercially used in furnaces, boilers, and other burners, contain some amount of sulfur. In most instances, it is quite expensive and technically difficult to remove the sulfur before burning the fuel. It has been a common practice, therefore, to burn fuels which still contain a portion of the native sulfur. Sulfur compounds, including $SO_2$ and $SO_3$, are then produced during combustion and must be removed from the effluent gas stream by separate expensive technologies.

Combustion of a sulfur-containing fuel in a boiler, furnace, or other burner typically produces combustion effluents in which 98% to 99% of the sulfur exist in the form of $SO_2$, and only 1% to 2% of the sulfur exists in the form of $SO_3$. In processes such as that described in the '554 patent where NO is reduced by injecting ammonia into the gas stream, some of the ammonia or ammonia precursors injected into the process will be left unreacted. Under certain conditions $NH_3$ will react with the sulfur gases, i.e., as the combustion effluents cool, the remaining $NH_3$ will react with $SO_3$ and water vapor present in the effluent stream to form $NH_4HSO_4$ according to reaction equation (1):

$$NH_3 + SO_3 + H_2O \rightarrow NH_4HSO_4 \quad (1)$$

Unfortunately, $NH_4HSO_4$ is an extremely sticky and corrosive liquid and is known to damage the equipment used in combustion processes.

The temperature at which the formation of $NH_4HSO_4$ occurs is such that in a typical boiler or furnace of the type generally encountered in combustion processes, formation of $NH_4HSO_4$ occurs within the air heater. Thus, fouling, corrosion, and plugging of the air heater has been commonly encountered. As a result, the nitric oxide reduction technologies which use ammonia and ammonia precursors have had severe limitations and their commercial acceptance has been correspondingly limited. The operators of boilers and furnaces are often extremely reluctant to accept any technology which can cause fouling, plugging, and corrosion such as that expected from $NH_4HSO_4$.

It will be noted that in the event that there are no sulfur oxides in the effluent stream, the formation of $NH_4HSO_4$ is not a problem. In many combustion applications, however, there will be at least a small quantity of sulfur oxides in the effluent stream and, thus, some $SO_3$. The ammonia or ammonia precursors which are used in the nitric oxide reduction reactions can then react with the $SO_3$ present to form $NH_4HSO_4$, which even in small quantities can cause severe problems over time.

It is apparent that one important need in the art is a method for the prevention of the formation of $NH_4HSO_4$ during the reduction of $NO_x$ in the presence of ammonia, or ammonia precursors, when sulfur is present in the effluent stream. It would be an advancement in the art to provide such a method which was operable during the noncatalytic reduction of NO.

It would be a further advancement in the art to provide for the removal of $SO_3$ from the effluent stream so that formation of $NH_4HSO_4$ was prevented. It would be a further advancement in the art if $SO_3$ could be selectively and noncatalytically reduced to $SO_2$, which can be readily removed by conventional techniques.

C. Sulfuric Acid Production

As mentioned above, the combustion of coal, fuel oil, or other sulfur containing fuel in a normal boiler or furnace produces a flue gas which contains some sulfur oxides. Generally 98–99 percent of the sulfur is oxide gas in the form of $SO_2$ and 1–2 percent is $SO_3$. From an air pollution control viewpoint, the major concern is the total emission of sulfur oxides to the atmosphere. In terms of boiler or furnace operation, however, the production of this small amount of $SO_3$ is a major problem even in environments which are essentially free of ammonia.

When the flue gas cools, the $SO_3$ reacts with water to form a mist of sulfuric acid. If the back end of the boiler of furnace is cool enough so that this acid mist forms inside the unit, severe corrosion problems result. Alternatively, if the back end is warm enough to prevent acid mist formation but the stack is not, the acid mist tends to incorporate any soot that the flue gas may contain. This mixture falling in the immediate vicinity of a smoke stack can cause severe local problems (i.e., the "acid smut" problem encountered with fuel oil firing).

In the past, the accepted cure for this problem was to keep the temperature of the flue gas throughout the boiler and the stack well above the acid mist point. That is, the problem was solved by deliberately wasting some of the heat produced by burning the fuel. This deliberate waste was always troublesome in that inefficiency was assumed in the operation. This energy waste is especially unsatisfactory now that energy conservation is a matter of national priority.

Thus, it will be appreciated that in processes which do not employ ammonium compounds to control $NO_x$, production of $SO_3$ is still a very significant problem. Instead of producing sticky and corrosive ammonium bisulfate, sulfuric acid is produced. Depending on the specific temperature conditions, sulfuric acid may occur within the combustion equipment or in the ambient environment. In either case, undesirable results follow.

Accordingly, an inexpensive gas phase homogeneous reaction in which $SO_3$ was reduced to $SO_2$ would be an ideal solution to both sets of problems. It would be a further advancement in the art to reduce $SO_3$ and thereby avoid sulfuric acid formation using a noncatalytic reaction. It would be a related advancement in the art to remove $SO_3$ during the combustion process such that subsequent removal of $SO_3$ was not necessary.

Such methods and apparatus are disclosed and claimed below.

BRIEF SUMMARY AND OBJECTS OF THE INVENTION

One embodiment of the present invention is related to a method for preventing the formation of $NH_4HSO_4$ during the noncatalytic reduction of nitrogen oxides by ammonia or ammonia precursors. As was discussed above, when $NO_x$ (primarily NO) is reduced using ammonia or ammonia precursors to form nitrogen, in the presence of some $SO_3$, the formation of $NH_4HSO_4$ often occurs. The formation of this sticky and corrosive substance inside the combustion unit downstream of the NO reduction zone is an extreme limitation upon the usefulness of nitrogen oxide reduction processes, including specifically the nitrogen oxide reduction process of the '554 patent.

In another embodiment, the present invention is related to methods for preventing the formation of sulfuric acid. As discussed above, when $SO_3$ and water vapor are both present in a hot effluent stream, a reaction of the two to form sulfuric acid is expected. It will be appreciated that this reaction is particularly prevalent where ammonia is not being used to reduce $NO_x$ emissions.

The present invention teaches the use of methanol to reduce $SO_3$ in the effluent stream to $SO_2$ in order to prevent formation of sulfuric acid or ammonium bisulfate. The methanol is oxidized in the process, with the chief product of that oxidation being carbon monoxide ("CO"). It will readily be appreciated that the emission of more than a small amount of CO to the atmosphere can be an undesirable condition. Accordingly, the present invention also teaches a method whereby the amount of CO emitted to the atmosphere is limited to acceptably small values by limiting the amount of CO initially produced. This is accomplished by using methanol in only limited amounts.

Since the process of the reduction of $SO_3$ with methanol is extremely selective, it is possible to limit the amount of methanol which is used. As a result, when employing the present invention, only limited amounts of carbon monoxide are emitted to the atmosphere.

The noncatalytic reduction of $SO_3$ by methanol is selective in that a large fraction of the $SO_3$ is converted to $SO_2$, while very little oxygen is consumed on a percentage basis. During the process, it is also found that NO tends to be oxidized to $NO_2$. The amount of methanol which must be used, therefore, is related to the total amount of NO and $SO_3$ present in the combustion effluents.

Accordingly, it is preferred that in order to provide enough methanol for a substantial reduction of $SO_3$, but not enough to cause unnecessary emissions of CO, the amount of methanol contacted into the combustion effluents should be in the approximate mole ration of from about 0.8 to about 2.0, with respect to the sum of NO and $SO_3$. In most applications, it is expected that the preferably range will be from about 0.9 to about 1.5.

In order to keep the absolute amount of carbon monoxide emitted to the atmosphere to acceptably low levels, it is also a teaching of the present invention that the amount of methanol injected into the combustion effluent stream should be less than about 100 ppm, and preferably less than about 500 ppm.

According to the present invention, the methanol is contacted with the combustion effluents at a temperature in the range from about 500° C. to about 950° C. in order to assure proper operation of the process. Temperatures which are significantly outside of that range tend to greatly reduce the effectiveness of the process.

It is also important to limit the reaction time so that the carbon monoxide produced by methanol oxidation is not itself oxidized to carbon dioxide. It is well known that the oxidation of CO produces concentrations of oxygen atoms and OH radicals which can again oxidize $SO_2$ to $SO_3$. Thus, if the CO is allowed to oxidize to $Co_2$ the process will be defeated in that $SO_3$ will again enter the environment and produce the possibility of forming additional $NH_4HSO_4$ or $H_2SO_4$.

It is important, therefore, to minimize the reoxidation of $SO_2$ to $SO_3$ by limiting the reaction time, so as in turn to minimize the oxidation of CO. According to the present invention, the reaction time should be less than about 5.0 seconds, and preferably in the range from about 0.01 seconds to about 5.0 seconds.

It is, therefore, a primary object of the present invention to provide methods for preventing the formation of $NH_4HSO_4$ during the reduction of $NO_x$.

It is a related object of the present invention to prevent the formation of $NH_4HSO_4$ during the reduction of $NO_x$ where ammonia and ammonia precursors, along with $SO_3$, are present in the effluent environment.

It is another primary object of the present invention to provide methods for preventing the formation of sulfuric acid in effluent streams.

It is a related object of the invention to prevent sulfuric acid formation emissions streams containing $SO_3$ and water.

It is also object of the present invention to remove $SO_3$ from the effluent stream by converting the $SO_3$ to $SO_2$, in order to prevent the above-mentioned reactions.

It is more specifically an object of the present invention to selectively and noncatalytically reduce $SO_3$ to $SO_2$ using in order to correspondingly limit the amount of carbon monoxide produced.

These and other objects of the invention will become apparent upon reading the following detailed description and appended claims.

DETAILED DESCRIPTION OF THE PREFERRED EMBODIMENTS

I. General Discussion

As described above, the present invention relates to the prevention of the formation of $NH_4HSO_4$ or $H_2SO_4$ in boilers, furnaces, and other burners. Particularly, the present invention relates to the removal of $SO_3$ from the stream of exhaust gases from certain types of pollution emitting facilities so that it is unavailable to react to form $NH_4HSO_4$ when ammonia and ammonia precursors are used to remove $NO_x$ from the exhaust gases of such facilities, or $H_2SO_4$ in the absence of ammonia but in the presence of water.

As briefly discussed above, the formation of $NH_4HSO_4$ becomes a problem when the $SO_3$ and ammonia (or ammonia precursors) are present in the effluent gas stream within the critical temperature range. Ammonia and its precursors are widely used in the conversion of NO to nitrogen in such effluent gas streams. This reduction reaction is performed in order to remove the NO, thereby minimizing eventual $NO_2$ pollution in the ambient atmosphere.

In order for $NH_4HSO_4$ to be formed, $SO_3$ must be present. The $SO_3$ reacts with the ammonia an water to form the fouling and corrosive $NH_4HSO_4$ compound. While $SO_3$ comprises only a relatively small percentage of the total sulfur generally emitted, its presence, even in small quantities, can result in the formation of sufficient $NH_4HSO_4$ to cause damage to combustion facilities. Although the present invention will likely only find use where significant amounts of sulfur are emitted, such facilities are numerous.

Generally $NH_4HSO_4$ at levels below 1 ppm (the term "ppm" is used herein to signify moles per million moles of combustion effluents) is not a serious problem. Thus, the embodiment of the invention related to preventing $NH_4HSO_4$ formation is primarily useful in facilities where combustion effluents contain at least 1 ppm $NH_3$ and at least 1 ppm $SO_3$. Since $SO_3$ generally comprises 1% to 2% of the total $SO_x$, the present invention will find its primary application in effluents containing more than 50 ppm $SO_x$.

The present invention is also useful in facilities that do not use ammonia to reduce $NO_x$. In such facilities the reaction of $SO_3$ and water to produce sulfuric acid becomes a serious problem. Therefore, the present invention can also be employed to prevent this undesirable chemical reaction.

II. The Process of the Preferred Embodiment

The processes of the present invention involve contacting the combustion effluents with methanol. Since methanol will produce CO in the course of the process, it is necessary to limit both the relative and absolute amounts of methanol used.

The present invention teaches the selective, noncatalytic, reduction o $SO_3$ by methanol, such that a large percentage of $SO_3$ is converted to $SO_2$. While, on a percentage basis, very little oxygen is consumed during this reaction process, some NO is converted to $NO_2$. Thus, the amount of methanol which must be used is directly related to the total amount of NO and $SO_3$ present in the combustion effluents.

Accordingly, it is important to the present invention to provide enough methanol to accomplish substantial reduction of $SO_3$, but not enough methanol to cause unnecessary emissions of CO. The amount of methanol used in combination with the combustion effluents will generally be in the mole ratio with respect to NO and $SO_3$ in the range of from about 0.8 to about 2.0. In most applications, that ratio will preferably be in the range of from about 0.19 to about 1.5 of NO and $SO_3$.

NO concentrations are much more easily measured than $SO_3$ concentrations and the amount of NO in the effluent gases is much larger than the amount of $SO_3$. Hence, in most situations, it is both acceptably accurate and more convenient to control the amount of methanol used with relationship to the relatively larger and more readily measured NO concentration, rather than $SO_3$ concentration.

In any commercially viable effluent gas treatment process, it is important to limit the absolute amount of carbon monoxide emitted to the atmosphere to acceptably small levels; generally, the amount of CO emitted to the atmosphere should not exceed about 1000 ppm. In order to achieve this level of CO, it is important to the present invention that the amount of methanol injected into the combustion effluent gas generally be less than approximately 1000 ppm and preferably less than approximately 500 ppm. If more methanol is injected, additional pollution problems are encountered with respect to CO.

When the present invention is used in combination with $NO_x$ reduction, the contacting of the methanol and the combustion effluents is done downstream of the zone in which the combustion effluents are contacted with an NO reducing agent. That is, the methanol is contacted with the combustion effluents downstream from the point that ammonia or ammonia precursors are introduced into the effluent stream. It will be appreciated that it would be wasteful to introduce methanol into the stream until after the reduction of NO with $NH_3$ or its precursors since the amount of $CH_3OH$ needed to reduce $SO_3$ to $SO_2$ is related to the sum of NO and $SO_3$ at the point at which the methanol is contacted into the combustion effluents.

The temperature at which methanol is introduced into the combustion effluents must be carefully controlled in order to produce the desired results. It is presently preferred that the temperature be within the range of approximately 500° C. to about 950° C. When the temperature is significantly below 500° C., it has been found that the methanol will not react with the $SO_3$ to prevent the formation of $H_2SO_4$ or $NH_4HSO_4$ as the case may be.

For example, methanol may be injected into a stream of combustion effluents having the following composition:

| Component | Concentration |
| --- | --- |
| $NH_3$ | 5 ppm |
| $SO_3$ | 10 ppm |
| $SO_2$ | 500 ppm |
| NO | 600 ppm |
| $CH_3OH$ | 800 ppm |
| $O_2$ | 10% |
| $CO_2$ | 5% |
| $H_2O$ | 10% |
| $N_2$ | balance |

The effluent existing at a pressure of approximately 1 atmosphere and a reaction time of 5.0 seconds.

When the temperature is in the range of approximately 400° C., however, no reduction reaction between the methanol and $SO_3$ takes place, and $NH_4HSO_4$ forms. The same is true when $NH_3$ is not present. Under these conditions $H_2SO_4$ forms.

This is also true for excessively high temperatures. For example, methanol may be injected into a stream of combustion effluents having the following composition:

| Component | Concentration |
|---|---|
| $NH_3$ | 5 ppm |
| $SO_3$ | 10 ppm |
| $SO_2$ | 500 ppm |
| NO | 100 ppm |
| $CH_3OH$ | 150 ppm |
| $O_2$ | 3% |
| $CO_2$ | 10% |
| $H_2O$ | 14% |
| $N_2$ | balance |

Pressure is held at approximately 1 atmosphere and the reaction time is about 0.05 seconds.

When the temperature is at about 1050° C., the concentration of $SO_3$ increases from 10 ppm to 12.1 ppm. This illustrates generally that temperatures in excess of about 950° C. are not desirable for the selective reduction of $SO_3$ with methanol.

Similarly, when the methanol is introduced into the effluent stream at a temperature in the range of from about 500° C. to about 950° C., it is very important to control the reaction time used so that the CO produced by methanol oxidation is not again oxidized to $CO_2$. As mentioned above, it is well known that the oxidation of CO produces concentrations of oxygen atoms and OH radicals, and that oxygen and OH radicals can oxidize $SO_2$ back to $SO_3$. Consequently, in order to minimize the reoxidation of $SO_2$ to $SO_3$, one must limit the reaction time used so as to minimize the oxidation of CO.

Since combustion effluents cool as they flow through the boiler, furnace, or other burner facility, it is convenient to consider reaction time in terms of the interval between the time at which the combustion effluents are contacted by methanol and the time at which they cool to a particular temperature. It is presently preferred that reaction times be held within the range of from about 0.01 to about 5.0 seconds; the preferred reaction time will vary with the temperature at which the reaction occurs, as discussed hereinafter.

If methanol is contacted into the combustion effluents at a temperature of greater than 900° C., the interval between the time the combustion effluences are contacted with methanol and the time at which the combustion effluents cool to a temperature of about 900° C. or below is preferably no greater than 0.05 seconds. If the methanol contacts the effluents at a temperature greater than 800° C. but less than 900° C., the interval between that contacting and the time at which the combustion effluents cool to about 800° C. is preferably no greater than 0.2 seconds.

In a typical boiler or furnace, heat is removed from the combustion effluents by causing them to flow past rows of heating exchange tubes. These heat exchange tubes are typically arranged in banks with cavities between the banks. Thus, the combustion effluents flow through the cavities between the banks. The gases experience a time at nearly constant temperature but they cool at a high rate as they pass through each of the banks. It is within the scope of the present invention to introduce the methanol into the combustion effluents both while they are passing through a tube bank and in the cavity between tube banks.

According to the present invention, the combustion effluents may be contacted with gaseous methanol, liquid methanol, and/or an aqueous solution of methanol.

In addition to methanol, certain other species may be acceptable for use in the reactions of the present invention. Such species include, for example, formaldehyde. Methanol, however, is presently preferred in that methanol if very low in cost and is also extremely high in efficiency in driving the desirable reactions of the present invention.

In one embodiment of the present invention, liquid methanol, or an aqueous solution of methanol, is atomized by a jet of gas and then injected into the combustion effluents. The vaporization of the liquid droplets is a process requiring a finite time. Hence, contacting the methanol with the combustion effluents occurs not immediately upon injection but only after some delay. In one embodiment, the gas used to atomize the methanol solution contains $NH_3$. Thus, with a single injection, it is possible to obtain immediate contacting of the combustion effluents with $NH_3$ and a subsequent contacting with methanol. This process achieves both the selective reduction of NO and a subsequent selective reduction of $SO_3$ to $SO_2$.

It is well known that complex chemical reactions occur by a series of elementary reactions, and that if one knows the rate constants of such steps a theoretical kinetic mechanism can be developed and used to calculate the behavior of the reaction under any set of conditions. Mechanisms describing the oxidation of light oxygenated hydrocarbons, such as methanol, the interconversion of NO and other nitrogen compounds at high temperatures, and the interconvertion of sulfur compounds have been developed. Seeker et al., "Gas Phase Chemistry Development and Verification of a Mechanism for NO Formation and Destruction in Hydrocarbon Flames," EPA-600/7-85-6. Final Report Contract EPA 68-02-2631, 1985; Vandooren et al., "Experimental Investigation of Methanol Oxidation in Flames: Mechanisms and Rate Constants of Elementary Steps," Eighteenth Symposium (Intl.) on Combustion, The Combustion Institute 473–483 (1981); Smith et al., 30 Combustion Science and Technology, 241 (1983); and Martin et al., 90 Journal of Physical Chemistry, 4143 (1986). Assembling these mechanisms produces a kinetic mechanism. Such a mechanism is assumed in the examples set forth below.

III. Examples of Preferred Embodiments of the Present Invention

The following examples are given to illustrate the process of the present invention, but the examples are not intended to limit the scope of the present invention.

EXAMPLE 1

Methanol is injected into an effluent stream having the following composition:

| Component | Concentration |
|---|---|
| $NH_3$ | 5 ppm |
| $SO_3$ | 10 ppm |
| $SO_2$ | 500 ppm |
| NO | 600 ppm |
| $CH_3OH$ | 800 ppm |
| $O_2$ | 10% |
| $CO_2$ | 5% |
| $H_2O$ | 10% |
| $N_2$ | balance |

| Component | Concentration |
|---|---|
| $NH_3$ | 5 ppm |
| $SO_3$ | 10 ppm |
| $SO_2$ | 500 ppm |
| NO | 600 ppm |
| $CH_3OH$ | 800 ppm |
| $O_2$ | 10% |
| $CO_2$ | 5% |
| $H_2O$ | 10% |
| $N_2$ | balance |

The reaction time is 3.0 seconds and the pressure is held at 1 atmosphere. The temperature is set at a constant 600° C.

It is found under these conditions that at the end of 3.0 seconds, the $SO_3$ is reduced from 10 ppm to 0.04 ppm and no significant amounts of $NH_4HSO_4$ are formed. This example illustrates that in temperatures in excess of 500° C., selective reduction of $SO_3$ takes place with methanol, and thus formation of $NH_4HSO_4$ is prevented.

EXAMPLE 2

Methanol is injected into a effluent stream having the following composition:

| Component | Concentration |
|---|---|
| $NH_3$ | 5 ppm |
| $SO_3$ | 10 ppm |
| $SO_2$ | 500 ppm |
| NO | 100 ppm |
| $CH_3OH$ | 150 ppm |
| $O_2$ | 3% |
| $CO_2$ | 10% |
| $H_2O$ | 14% |
| $N_2$ | balance |

| Component | Concentration |
|---|---|
| $NH_3$ | 5 ppm |
| $SO_3$ | 10 ppm |
| $SO_2$ | 500 ppm |
| NO | 100 ppm |
| $CH_3OH$ | 150 ppm |
| $O_2$ | 3% |
| $CO_2$ | 10% |
| $H_2O$ | 14% |
| $N_2$ | balance |

The reaction time is 0.05 seconds and the pressure is held at 1 atmosphere. The reaction temperature is set at 900° C.

It is found under these conditions that $SO_3$ is reduced from 10 ppm to 1.74 ppm and no significant amounts of $NH_4HSO_4$ are formed. This example illustrates that temperatures below 950° C. can be useful for the selective reduction of $So_3$ with methanol and prevention of the formation of $NH_4HSO_4$.

EXAMPLE 3

In this example, methanol is injected into a combustion effluent stream. Pressure is held at approximately 1 atmosphere and constant temperature at 700° C. is maintained. The composition of the effluent stream, including methanol, is as follows:

| Component | Concentration |
|---|---|
| $NH_3$ | 5 ppm |
| $SO_3$ | 10 ppm |
| $SO_2$ | 500 ppm |
| NO | 600 ppm |
| $CH_3OH$ | 1600 ppm |
| $O_2$ | 10% |
| $CO_2$ | 5% |
| $H_2O$ | 10% |
| $N_2$ | balance |

In this example the reaction time is about 1.0 second.

It is found that $SO_3$ is reduced from 10 ppm to 0.11 ppm and that no significant amounts of $NH_4HSO_4$ formed. However, the CO concentration at the conclusion of the reaction is 1256 ppm.

This example illustrates that selective reduction of $SO_3$, and prevention of $NH_4HSO_4$ formation, occurs under these conditions. However, emissions of CO increase dramatically to a generally unacceptable level.

EXAMPLE 4

Methanol in injected into an effluent stream having the same composition as that illustrated in Example 3 except that initial methanol concentration is reduced from 1600 ppm to 800 ppm, which is within the generally accepted limits for CO emissions into the atmosphere.

It is found under these conditions that $SO_3$ is reduced from 10 ppm to 0.044 ppm and that no significant amounts of $NH_4HSO_4$ are formed. Furthermore, the CO concentration is only 606 ppm.

This example illustrates that initial concentration of methanol less than approximately 1,000 ppm are effective for selectively reducing $So_3$ without resulting in excessive CO emissions.

EXAMPLE 5

In this example, methanol is injected into a combustion effluent stream. Pressure is held at 1 atmosphere and constant temperature at 900° C. is maintained. The reaction time is about 0.01 seconds. The composition of the effluent stream, including methanol, is as follows:

| Component | Concentration |
|---|---|
| $NH_3$ | 5 ppm |
| $SO_3$ | 10 ppm |
| $SO_2$ | 500 ppm |
| NO | 100 ppm |
| $CH_3OH$ | 300 ppm |
| $O_2$ | 3% |
| $CO_2$ | 10% |
| $H_2O$ | 14% |
| $N_2$ | balance |

It is found that $So_3$ is reduced from 10 ppm to 0.009 ppm and that no significant amounts of $NH_4HSO_4$ are formed. The CO level increases to 96.5 ppm. It is noted that the ratio of moles of NO and $SO_3$ is 2.73.

EXAMPLE 6

Methanol is injected into an effluent stream having the same composition as that illustrated in Example 5, except that the initial concentration of methanol is reduced to 150 ppm.

It is found under these conditions that SO$_3$ concentration is reduced to 0.016 ppm, and the CO concentration is only 53.7 ppm.

In this example the ratio of the concentration of CH$_3$OH to the sum of the concentrations of SO$_3$ and NO is 1.36. This example, along with Example 5, illustrate that the use ratio of moles of CH$_3$OH to the sum of moles of NO plus SO$_3$ in the range 0.8 to 2.0 is sufficient to reduce SO$_3$ efficiently without causing larger than necessary emissions of CO to the atmosphere.

EXAMPLE 7

Methanol is injected into an effluent stream. Pressure is held at approximately 1 atmosphere and a constant temperature of 950° C. is maintained. The reaction time is 0.3 seconds. The composition of the effluent stream, including methanol, is as follows:

| Component | Concentration |
|---|---|
| NH$_3$ | 5 ppm |
| SO$_3$ | 10 ppm |
| SO$_2$ | 500 ppm |
| NO | 100 ppm |
| CH$_3$OH | 150 ppm |
| O$_2$ | 3% |
| CO$_2$ | 10% |
| H$_2$O | 14% |
| N$_2$ | balance |

Following this reaction, the temperature is abruptly decreased until no further reaction occurs. In this example it is found that SO$_3$ concentration increases from 10 ppm to 12.3 ppm with corresponding NH$_4$HSO$_4$ formation. CO concentration is 3.6 ppm. This is due to reaction temperatures in excess of 900° C. coupled with a reaction time in excess of 0.05 seconds.

EXAMPLE 8

Methanol is injected into an effluent stream having the same composition as that illustrated in Example 7. Reaction time is decreased to 0.05 seconds. The result is that SO$_3$ in the effluent stream decreases from 10 ppm to 0.12 ppm and CO was 53 ppm.

This example, taken in conjunction with comparative Example 7, illustrates that if methanol is contacted into combustion effluents at a temperature greater than 900° C., the interval between the point of contact and the point at which the combustion effluents cool to 900° C. should be no greater than about 0.05 seconds. Use of an interval which is not greater than 0.05 seconds in this example produces a satisfactory reduction of SO$_3$, whereas in Example 7 use of an interval which is greater than 0.05 proved counterproductive due to oxidation of CO to CO$_2$.

EXAMPLE 9

Methanol is injected into an effluent stream having the same composition as that illustrated in Example 7. The reaction time is 1.0 second at a constant temperature of 900° C. and a pressure of 1 atmosphere.

Following this reaction time, the mixture is abruptly cooled to a temperature such that no further reaction occurs. SO$_3$ increases from 10 ppm to 10.27 ppm and CO is 1.1 ppm.

EXAMPLE 10

Methanol is injected into an effluent stream having the same composition as that illustrated in Example 7. The reaction time is 0.1 seconds at a constant temperature of 900° C. and a pressure of one atmosphere. Following this reaction time, the mixture is abruptly cooled to a temperature such that no further reaction occurs. The result is that SO$_3$ is reduced from 10 ppm to 0.018 ppm and CO is 56 ppm.

The results of this example, taken in conjunction with Example 9 illustrates that if methanol is contacted into combustion effluents at a temperature greater than 800° C., the interval between contacting and the point at which the combustion effluents cool to 800° C. should preferably be no greater than 0.2 seconds. Use in this example of an interval which was not greater than 0.2 seconds produces a satisfactory reduction of SO$_3$ to SO$_2$ whereas in Example 9 use of of an interval greater than 0.2 seconds proves counterproductive due to the oxidation of CO to CO$_2$.

EXAMPLE 11

In this example, the experiment described in Example 1 is repeated, however, NH$_3$ is eliminated from the effluent stream. It is found under these conditions that at the end of 3.0 seconds, the SO$_3$ is reduced from 10 ppm to 0.04 ppm and no significant amounts of H$_2$SO$_4$ are formed.

EXAMPLE 12

In this example, the experiment described in Example 2 is repeated, however, NH$_3$ is eliminated from the effluent stream. It is found under these conditions that SO$_3$ is reduced from 10 ppm to 1.74 ppm and that no significant amounts of H$_2$SO$_4$ are formed.

EXAMPLE 13

In this example, the experiment described in Example 3 is repeated, however, NH$_3$ is eliminated from the effluent stream. It is found in this example that SO$_3$ is reduced from 10 ppm to 0.11 ppm and no significant amounts of H$_2$SO$_4$ are formed. However, the CO concentration at the conclusion of the reaction is 1256 ppm.

EXAMPLE 14

In this example, the experiment described in Example 4 is repeated, however, NH$_3$ is eliminated from the effluent stream. It is found under these conditions that SO$_3$ is reduced from 10 ppm to 0.044 ppm and that no significant amounts of H$_2$SO$_4$ are formed. Furthermore, the CO concentration is only 606 ppm.

EXAMPLE 15

In this example, the experiment described in Example 5 is repeated, however, NH$_3$ is eliminated from the effluent stream. It is found that SO$_3$ is reduced from 10 ppm to 0.009 ppm and that no significant amounts of H$_2$SO$_4$ are formed. The CO level increases to 96.5 ppm.

EXAMPLE 16

In this example, the experiment described in Example 6 is repeated, however, NJ$_3$ is eliminated from the effluent stream. It is found under these conditions that SO$_3$ concentration is reduced to 0.016 ppm, and the CO concentration is only 53.7 ppm.

EXAMPLE 17

In this example, the experiment described in Example 7 is repeated, however, NH$_3$ is eliminated from the effluent stream. In this example it is found that SO$_3$ increases from 10 ppm to 12.3 ppm with corresponding $H_2SO_4$ formation. CO concentration is 3.6 ppm.

EXAMPLE 18

In this example, the experiment described in Example 8 is repeated, however, $NH_3$ is eliminated from the effluent stream. Reaction time is 0.05 seconds. The result is that $SO_3$ in the effluent stream decreases from 10 ppm to 0.012 ppm and CO is 53 ppm.

EXAMPLE 19

In this example, the experiment described in Example 9 is repeated, however, $NH_3$ is eliminated from the effluent stream. It is found under these conditions that $SO_3$ increases from 10 ppm to 10.27 ppm and CO is 1.1 ppm.

EXAMPLE 20

In this example, the experiment described in Example 10 is repeated, however, $NH_3$ is eliminated from the effluent stream. The result is that $SO_3$ is reduced from 10 ppm to 0.01 ppm and CO is reduced to 56 ppm.

IV. Summary

In view of the foregoing discussion and examples of the preferred embodiments of the present invention, it will be appreciated that the present invention accomplishes each of the objects of the invention set forth above. In particular, the present invention provides a method for preventing the formation of $NH_4HSO_4$ during the reduction reaction of $NO_x$ when ammonia or ammonium precursors are present. In particular, $SO_3$ tends to react with the species present in the effluent stream to produce $NH_4HSO_4$. As a result, the present invention provides an effective method for reducing $SO_3$ to $SO_2$ so that $NH_4HSO_4$ does not form in the effluent stream.

Similarly, the present invention provides methods for preventing $H_2SO_4$ formation when $NH_3$ is absent. As mentioned above, $SO_3$ reacts with $H_2O$ t form $H_2SO_4$ under the conditions described above.

In addition, it will be appreciated that the reaction parameters of the processes of the present invention are specific. Thus, only limited amounts of methanol are required in order to reduce the $SO_3$ to $SO_2$; otherwise, other undesirable species, such as carbon monoxide, are produced in significant amounts by the process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to embraced within their scope.

What is claimed and desired to be secured by United States Letters Patent is:

1. A process for minimizing the formation of $H_2SO_4$ in a combustion effluent having NO, at least 1 ppm $SO_3$, and water vapor, the process comprising the step of contacting the combustion effluents with methanol, in an amount such that the mole ratio of the methanol to the sum of NO and $SO_3$ is in the range of from about 0.8 to about 2.0, at a temperature in the range from about 500° C. to about 950° C., said methanol reducing the $SO_3$ in the combustion effluent to $SO_2$, thereby minimizing the formation of $H_2SO_4$.

2. A process as defined in claim 1 wherein the environment comprises at least 50 ppm $SO_x$.

3. A process as defined in claim 1 wherein the methanol injected comprises less than approximately 1,000 ppm of the total combustion effluents.

4. A process as defined in claim 1 wherein the methanol injected comprises less than approximately 500 ppm of the total combustion effluents.

5. A process as defined in claim 1 wherein the ratio of moles of methanol to the sum of moles of NO and $SO_3$ is in the range of from approximately 0.9 to approximately 1.5.

6. A process as defined in claim 1 wherein the temperature of the combustion effluents at the point of contacting the methanol is at least 900° C. and wherein the period between the time at which the methanol is introduced into the effluents and the time in which the effluents cool to below 900° C. is no greater than approximately 0.05 seconds.

7. A process as defined in claim 1 wherein the temperature of the combustion effluents at the point of contacting with methanol is between approximately 800° C. and approximately 900° C. and wherein the period between the time at which the methanol is introduced into the effluents and the time when the effluents cool to below 800° C. is no greater than approximately 0.2 seconds.

8. A method of reducing $SO_3$ to $SO_2$ in a stream of combustion effluents, wherein the stream of effluents is at a temperature between approximately 500° C. and approximately 950° C. and wherein the stream of effluents comprises at least 50 ppm $SO_x$, water, and NO, comprising the step of introducing methanol into the stream of effluents such that the ratio of moles of methanol to the sum of the moles of $SO_3$ and NO is in the range of from approximately 0.8 to approximately 2.0.

9. A method of reducing $SO_3$ to $SO_2$ in a stream of combustion effluents as defined in claim 8 wherein the methanol is in liquid form.

10. A method of reducing $SO_3$ to $SO_2$ in a stream of combustion effluents as defined in claim 8 wherein the methanol is atomized and propelled into the stream of effluents by a jet of gas.

11. A method of reducing $SO_3$ to $SO_2$ in a stream of combustion effluents as defined in claim 10 wherein the jet of gas comprises ammonia.

12. A method of reducing $SO_3$ to $SO_2$ in a stream of combustion effluents as defined in claim 8 wherein the ratio of moles of methanol to the sum of the moles of NO and $SO_3$ is in the range of from approximately 0.8 to approximately 1.5.

13. A method of reducing $SO_3$ to $SO_2$ in a stream of combustion effluents as defined in claim 8 wherein the temperature of the combustion effluents at the point of contacting the methanol is at least 900° C. and wherein the period between the time at which the methanol is introduced into the effluents and the time in which the effluent is cooled to below 900° C. is no greater than approximately 0.05 seconds.

14. A method of reducing $SO_3$ to $SO_2$ in a stream of combustion effluents as defined in claim 8 wherein the temperature of the combustion effluents at the point of contacting with methanol is between approximately 800° C. and approximately 900° C. and wherein the period between the time at which the methanol is introduced into the effluent and the time when the effluents cool to below 800° C. is no greater than approximately 0.2 seconds.

15. A method of reducing $SO_3$ to $SO_2$ in a stream of combustion effluents as defined in claim 8 wherein the methanol introduced into the stream of effluents comprises less than approximately 1000 ppm of the total combustion effluents.

16. A method of reducing $SO_2$ to $SO_3$ in a stream of combustion effluents as defined in claim 8 wherein the methanol introduced into the stream of effluents comprises less than approximately 500 ppm of the total combustion effluents.

17. A method for preventing the formation of $H_2SO_4$ by reducing $SO_3$ to $SO_2$ in a stream of combustion effluents wherein the stream of combustion effluents comprises at least 1 ppm $SO_3$, NO, and water vapor wherein the temperature of the stream of effluents is between approximately 500° C. and approximately 950° C. comprising introducing methanol into the stream of effluents such that the ratio of the moles of methanol to the sum of the moles of $SO_3$ and NO is in the range of approximately 0.8 to approximately 1.5.

18. A method for preventing the formation of $H_2SO_4$ as defined in claim 17 wherein the temperature of the combustion effluents is at least 900° C. and wherein the period between the time at which the methanol is introduced into the effluents and the time when the effluents cool to below 900° C. is no greater than approximately 0.05 seconds.

19. A method for preventing the formation of $H_2SO_4$ as defined in claim 17 wherein the temperature of the combustion effluents is between approximately 800° C. and approximately 900° C. and wherein the period between the time at which the methanol is introduced into the effluents and the time when the effluents cool to below 800° C. is no greater than approximately 0.2 seconds.

20. A process for removing $SO_3$, a precursor of $H_2SO_4$, in a combustion effluent having NO, at least 1 ppm $SO_3$ and water vapor, the process comprising the step of contacting the combustion effluent with methanol in an amount such that the mole ratio of methanol to the sum of NO and $SO_3$ is in the range of from about 0.8 to about 2.0, at a temperature in the range from about 500° C. to about 950° C., said methanol contacting the combustion effluent in order to reduce the $SO_2$ to $SO_3$, thereby minimizing the formation of $H_2SO_4$, the methanol being present in an amount insufficient to increase the amount of CO formed to unacceptable emission levels by the oxidation of methanol.

21. A process for removing $SO_3$, a precursor of $H_2SO_4$, in a combustion effluent as defined in claim 20 wherein the methanol injected comprises less than approximately 1,000 ppm of the total combustion effluents.

22. A process for removing $SO_3$, a precursor of $H_2SO_4$, in a combustion effluent as defined in claim 20 wherein the ratio of moles of methanol to the sum of the moles of NO and $SO_3$ is in the range of from approximately 0.9 to approximately 1.5 such that the production of CO is minimized.

23. A process for removing $SO_3$, a precursor of $H_2SO_4$, in a combustion effluent as defined in claim 20 wherein the temperature of the combustion effluents at the point of contacting the methanol is at least 900° C. and wherein the period between the time at which the effluents cool to below 900° C. is no greater than approximately 0.05 seconds.

24. A process for removing $SO_3$, a precursor of $H_2SO_4$, in a combustion effluent as defined in claim 20 wherein the temperature of the combustion effluents at the point of contacting with methanol is between approximately 800° C. and approximately 900° C. and wherein the period between the time at which the methanol is introduced into the effluents and the time when the effluents cool to below 800° C. is no greater than approximately 0.2 seconds.

* * * * *

UNITED STATES PATENT AND TRADEMARK OFFICE
CERTIFICATE OF CORRECTION

PATENT NO.   :   4,849,192
DATED        :   July 18, 1989
INVENTOR(S) :   Richard K. Lyon It is certified that error appears in the above-identified patent and that said Letters Patent is hereby corrected as shown below:

Column 6, line 8, "ration" should be --ratio--
Column 6, line 11, "preferably" should be --preferable--
Column 6, line 16, "100 ppm," should be --1000 ppm,--
Column 6, line 52, "It is also object" should be --It is also an object--
Column 6, lines 57-58, "using in order to correspondingly limit the amount of carbon monoxide produced." should be --using methanol, while also limiting the amount of methanol used in order to correspondingly limit the amount of carbon monoxide produced.--
Column 7, line 19, "an" should be --and--
Column 8, line 59, "The effluent existing" should be --The effluent is--
Column 9, line 45, "effluences" should be --effluents--
Column 11, line 26, "a effluent stream" should be --an effluent stream--
Column 11, lines 40-50, chart should not be duplicated.
Column 14, line 14, delete second occurrence of the word "of"
Column 14, line 59, "NJ3" should be --$NH_3$--
Column 15, line 40, "t form" should be --to form--

Signed and Sealed this

Second Day of October, 1990

*Attest:*

HARRY F. MANBECK, JR.

*Attesting Officer*          *Commissioner of Patents and Trademarks*